(12) United States Patent
Gummadi et al.

(10) Patent No.: US 11,087,778 B2
(45) Date of Patent: Aug. 10, 2021

(54) SPEECH-TO-TEXT CONVERSION BASED ON QUALITY METRIC

(71) Applicant: QUALCOMM Incorporated, San Diego, CA (US)

(72) Inventors: Bapineedu Chowdary Gummadi, Hyderabad (IN); Soman Ganesh Nikhara, Hyderabad (IN); Ravi Shankar Kadambala, Hyderabad (IN); Ankita Anil Kumar Choudha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 16/277,106

(22) Filed: Feb. 15, 2019

(65) Prior Publication Data

US 2020/0265856 A1 Aug. 20, 2020

(51) Int. Cl.
| | |
|---|---|
| *G10L 21/0364* | (2013.01) |
| *G10L 15/26* | (2006.01) |
| *G10L 25/84* | (2013.01) |
| *G10L 25/60* | (2013.01) |
| *G10L 15/22* | (2006.01) |
| *H04B 1/3827* | (2015.01) |

(52) U.S. Cl.
CPC .......... *G10L 21/0364* (2013.01); *G10L 15/22* (2013.01); *G10L 15/26* (2013.01); *G10L 25/60* (2013.01); *G10L 25/84* (2013.01); *H04B 1/3827* (2013.01)

(58) Field of Classification Search
CPC ..... G10L 25/69; G10L 25/60; G10L 21/0208; G10L 13/027; G10L 21/10; G06F 3/167
See application file for complete search history.

(56) References Cited

U.S. PATENT DOCUMENTS

| | | | | |
|---|---|---|---|---|
| 5,615,298 | A * | 3/1997 | Chen ................. | G10L 19/12 704/228 |
| 5,742,733 | A * | 4/1998 | Jarvinen ............. | G10L 19/06 704/219 |
| 6,876,968 | B2 * | 4/2005 | Veprek .............. | G10L 13/033 704/258 |
| 7,295,982 | B1 * | 11/2007 | Cohen ............... | G10L 25/69 704/208 |
| 7,675,411 | B1 * | 3/2010 | Michaelis .......... | H04M 3/436 340/539.12 |
| 8,892,447 | B1 * | 11/2014 | Srinivasan ......... | G10L 15/01 704/277 |
| 9,082,414 | B2 * | 7/2015 | Talwar ............... | G10L 25/69 |
| 9,380,146 | B1 * | 6/2016 | Gopalakrishnan .. | G10L 13/08 |
| 9,390,725 | B2 * | 7/2016 | Graham ............. | G10L 21/0208 |
| 9,870,784 | B2 * | 1/2018 | Sharma ............. | G10L 25/60 |
| 10,685,669 | B1 * | 6/2020 | Lan .................. | G10L 15/1822 |

(Continued)

*Primary Examiner* — Anne L Thomas-Homescu
(74) *Attorney, Agent, or Firm* — Qualcomm Incorporated

(57) ABSTRACT

A method of communication includes determining, at a mobile device, a speech quality metric for an incoming speech signal associated with a voice call. The speech quality metric is based on an environment of the mobile device. The method also includes converting incoming speech associated with the incoming speech signal to text in response to a determination that the speech quality metric fails to satisfy a speech quality metric threshold. The method further includes displaying the text at a display screen of the mobile device during the voice call.

20 Claims, 5 Drawing Sheets

(56) References Cited

U.S. PATENT DOCUMENTS

| | | | |
|---|---|---|---|
| 10,720,157 B1* | 7/2020 | Kapila | G10L 15/1815 |
| 2006/0217159 A1* | 9/2006 | Watson | H04M 1/72522 |
| | | | 455/563 |
| 2007/0127688 A1* | 6/2007 | Doulton | G10L 15/26 |
| | | | 379/265.01 |
| 2007/0140471 A1* | 6/2007 | Gutta | H04M 1/6016 |
| | | | 379/392.01 |
| 2009/0048829 A1* | 2/2009 | Bodin | G06F 16/40 |
| | | | 704/235 |
| 2009/0055175 A1* | 2/2009 | Terrell, II | G10L 15/22 |
| | | | 704/235 |
| 2009/0164896 A1* | 6/2009 | Thorn | G06F 1/1686 |
| | | | 715/700 |
| 2011/0071821 A1* | 3/2011 | Konchitsky | G10L 15/20 |
| | | | 704/219 |
| 2012/0124525 A1* | 5/2012 | Kang | G06F 3/0482 |
| | | | 715/863 |
| 2013/0041646 A1* | 2/2013 | Farley | G08B 25/14 |
| | | | 704/2 |
| 2013/0054237 A1* | 2/2013 | Furman | G10L 15/26 |
| | | | 704/235 |
| 2013/0166279 A1* | 6/2013 | Dines | G10L 15/063 |
| | | | 704/8 |
| 2013/0262103 A1* | 10/2013 | Reiswig | H04R 29/007 |
| | | | 704/235 |
| 2014/0029778 A1* | 1/2014 | Bartunek | H04R 25/30 |
| | | | 381/317 |
| 2014/0095153 A1* | 4/2014 | de la Guardia Gonzales | G10L 25/48 |
| | | | 704/201 |
| 2014/0363005 A1* | 12/2014 | Konchitsky | G10L 21/0364 |
| | | | 381/58 |
| 2014/0365212 A1* | 12/2014 | Konchitsky | G10L 15/20 |
| | | | 704/219 |
| 2015/0229837 A1* | 8/2015 | Her | G06F 3/017 |
| | | | 348/222.1 |
| 2015/0242993 A1* | 8/2015 | Raman | G06T 3/40 |
| | | | 345/589 |
| 2015/0277552 A1* | 10/2015 | Wilairat | H04N 21/4884 |
| | | | 386/244 |
| 2015/0317979 A1* | 11/2015 | Yang | G10L 17/22 |
| | | | 704/235 |
| 2016/0022991 A1* | 1/2016 | Apoux | A61N 1/0541 |
| | | | 607/57 |
| 2016/0154624 A1* | 6/2016 | Son | H04M 1/7253 |
| | | | 704/235 |
| 2017/0125019 A1* | 5/2017 | Ganesan | H04M 1/72591 |
| 2017/0178627 A1* | 6/2017 | Firby | G10L 25/60 |
| 2017/0256269 A1* | 9/2017 | Jensen | H04R 25/505 |
| 2017/0279959 A1* | 9/2017 | Karimi-Cherkandi | H04Q 11/0428 |
| 2017/0300456 A1* | 10/2017 | Rimmer | G06F 40/186 |
| 2018/0091913 A1* | 3/2018 | Hartung | H03G 3/32 |
| 2018/0114509 A1* | 4/2018 | Mese | G06F 3/011 |
| 2018/0197564 A1* | 7/2018 | Taki | A61B 5/123 |
| 2018/0233127 A1* | 8/2018 | Visser | G10L 21/00 |
| 2018/0270350 A1* | 9/2018 | Engelke | G10L 15/265 |
| 2019/0306298 A1* | 10/2019 | Yoon | G06F 3/0346 |
| 2019/0387088 A1* | 12/2019 | Singh | G06K 9/00362 |
| 2020/0075044 A1* | 3/2020 | Jankowski, Jr. | G10L 15/183 |
| 2020/0105262 A1* | 4/2020 | Abhinav | G10L 15/02 |
| 2020/0143807 A1* | 5/2020 | Ko | G10L 15/16 |
| 2020/0143820 A1* | 5/2020 | Donofrio | H04R 3/005 |
| 2020/0175961 A1* | 6/2020 | Thomson | G10L 15/063 |
| 2020/0380959 A1* | 12/2020 | Chen | G10L 15/25 |

* cited by examiner

SPEECH-TO-TEXT CONVERSION BASED ON QUALITY METRIC

I. FIELD

The present disclosure is generally related to converting speech to text at a mobile device.

II. DESCRIPTION OF RELATED ART

Advances in technology have resulted in smaller and more powerful computing devices. For example, there currently exist a variety of portable personal computing devices, including wireless telephones such as mobile and smart phones, tablets, and laptop computers that are small, lightweight, and easily carried by users. These mobile devices can communicate voice and data packets over wireless networks. Further, many such devices incorporate additional functionality such as a digital still camera, a digital video camera, a digital recorder, and an audio file player. Also, such mobile devices can process executable instructions, including software applications, such as a web browser application, that can be used to access the Internet. As such, these mobile devices can include significant computing capabilities.

During a voice call between a first user and a second user, it may become increasingly difficult to communicate if one of the users is in a noisy environment. As a non-limiting example, if the first user is attending a concert in a stadium, it may be hard for the first user to understand incoming speech from the second user because of the background noise associated with the concert. Even in the scenario where the first user increases a call volume at a mobile device to better understand the incoming speech from the second user, little improvement may be realized. As a result, the users may become increasingly frustrated and impatient with one another during the voice call.

III. SUMMARY

According to a particular implementation of the techniques disclosed herein, a method of communication includes determining, at a mobile device, a speech quality metric for an incoming speech signal associated with a voice call. The speech quality metric is based on an environment of the mobile device. The method also includes converting incoming speech associated with the incoming speech signal to text in response to a determination that the speech quality metric fails to satisfy a speech quality metric threshold. The method further includes displaying the text at a display screen of the mobile device during the voice call.

According to another particular implementation of the techniques disclosed herein, a mobile device includes a speech quality metric determination unit configured to determine a speech quality metric for an incoming speech signal associated with a voice call. The speech quality metric is based on an environment of the mobile device. The mobile device also includes a speech-to-text converter configured to convert incoming speech associated with the incoming speech signal to text in response to a determination that the speech quality metric fails to satisfy a speech quality metric threshold. The mobile device further includes a display screen configured to display the text during the voice call.

According to another particular implementation of the techniques disclosed herein, a non-transitory computer-readable medium includes instructions that, when executed by a processor of a mobile device, cause the processor to perform operations including determining a speech quality metric for an incoming speech signal associated with a voice call. The speech quality metric is based on an environment of the mobile device. The operations also include converting incoming speech associated with the incoming speech signal to text in response to a determination that the speech quality metric fails to satisfy a speech quality metric threshold. The operations further include displaying the text at a display screen of the mobile device during the voice call.

According to another particular implementation of the techniques disclosed herein, a mobile device includes means for determining a speech quality metric for an incoming speech signal associated with a voice call. The speech quality metric is based on an environment of the mobile device. The mobile device also includes means for converting incoming speech associated with the incoming speech signal to text in response to a determination that the speech quality metric fails to satisfy a speech quality metric threshold. The mobile device further includes means for displaying the text during the voice call.

One advantage of the above-described implementations is, during a voice call, an ability to convert incoming speech to text when the incoming speech cannot be readily discerned by a user. For example, if the user is in a noisy environment, a mobile device can convert the incoming speech to text and display the text at a screen of the mobile device to enable the user to discern what is being said during the voice call. Other implementations, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. It may be further understood that the terms "comprise," "comprises," and "comprising" may be used interchangeably with "include," "includes," or "including." Additionally, it will be understood that the term "wherein" may be used interchangeably with "where." As used herein, "exemplary" may indicate an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

In the present disclosure, terms such as "determining", "calculating", "detecting", "estimating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "estimating", "using", "selecting", "accessing", and "determining" may be used interchangeably. For example, "generating", "calculating", "estimating", or "determining" a parameter (or a signal) may refer to actively generating, estimating, calculating, or determining the parameter (or the signal) or may refer to using, selecting, or accessing the parameter (or signal) that is already generated, such as by another component or device.

Figure 1:
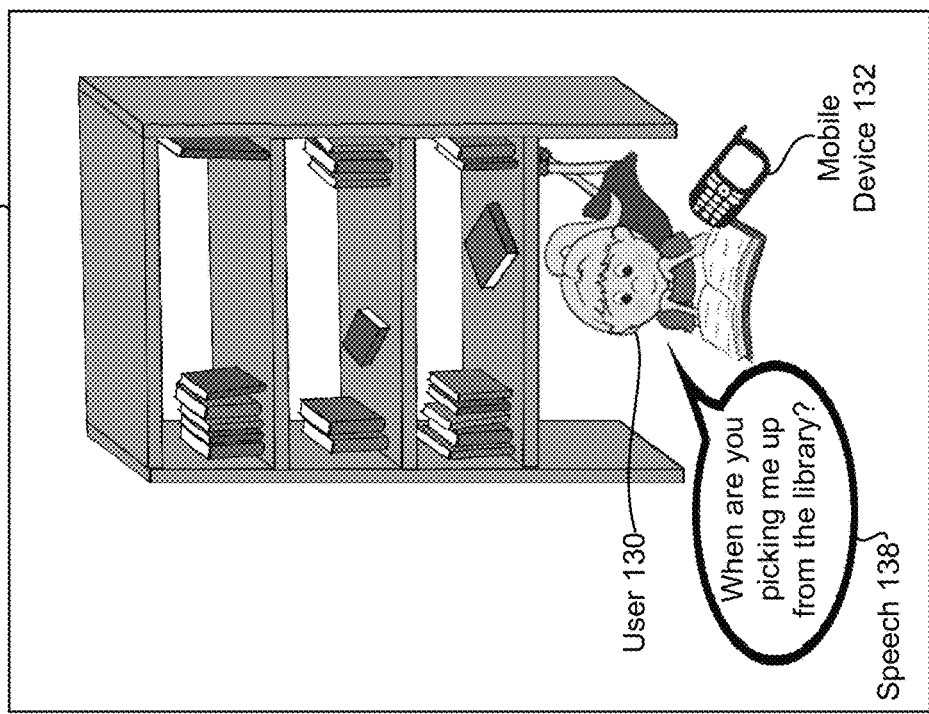
FIG. 1 is a diagram of an example of a system that includes an implementation of a mobile device operable to enable speech-to-text conversion based on a speech quality metric.
Figure 1:
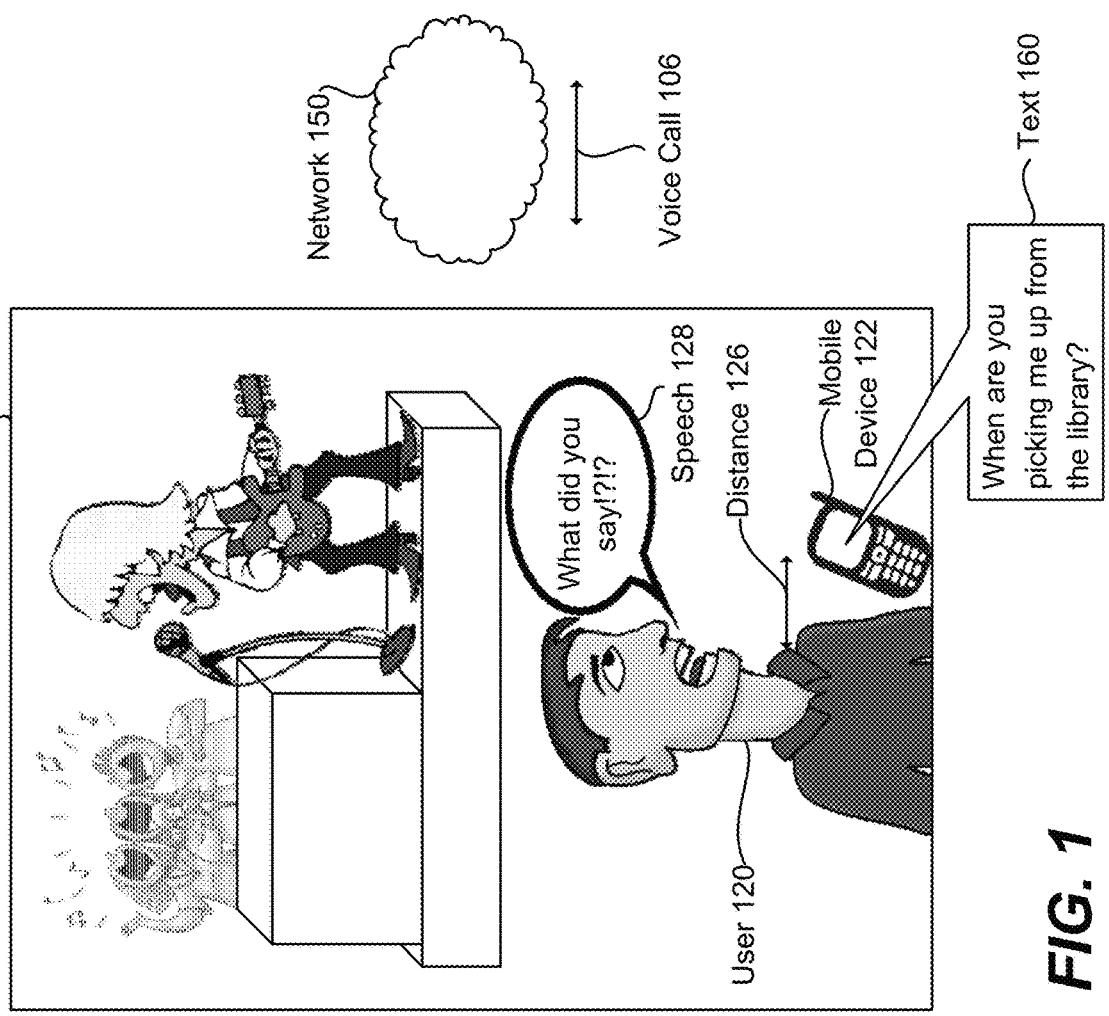

Referring to FIG. 1, a system 100 that includes a mobile device operable to enable speech-to-text conversion based on a speech quality metric is shown. In the system 100, a user 120 is located in an environment 102, and a user 130 is located in an environment 104. According to one implementation, the environment 102 is a relatively noisy environment, and the environment 104 is a relatively quiet environment (e.g., a noise-free environment). For example, in the illustration of the FIG. 1, the environment 102 is a concert, and the environment 104 is a library. It should be understood that the depicted environments 102, 104 in FIG. 1 are for illustrative purposes only and should not be construed as limiting.

The user 120 in the environment 102 may communicate with the user 130 in the environment 104 using their respective mobile devices 122, 132. For example, the users 120, 130 can vocally communicate with each other during a voice call 106 using their respective mobile devices 122, 132. The mobile device 122 can include a mobile phone, a personal digital assistant, a laptop, etc. In the illustrative example of FIG. 1, the mobile device 122 communicates with the mobile device 132 via a network 150 (e.g., a mobile network).

The mobile device 132 can detect speech 138 of the user 130 and can transmit the speech 138 over the network 150 to the mobile device 122 during the voice call 106. For example, the user 130 may speak "When are you picking me up from the library?" into a microphone of the mobile device 132. The microphone of the mobile device 132 can capture the speech 138, an encoder (e.g., a vocoder) of the mobile device 132 can encode the speech 138, and a transmitter of the mobile device 132 can transmit an encoded version of the speech 138 to be routed to the mobile device 122 during the voice call 106. Because the user 130 is in a relatively noise-free environment 104 (e.g., a library), the mobile device 132 may detect relatively little background noise while the user 130 speaks into the microphone of the mobile device 132. As a result, the signal-to-noise ratio of the speech 138 detected by the mobile device 132 may be relatively high.

A receiver of the mobile device 122 is configured to receive the encoded version of the speech 138 via the network 150 during the voice call 106. A decoder (e.g., a vocoder) of the mobile device 122 can decode the encoded version of the speech 138 to generate a decoded version of the speech 138. A speaker of the mobile device 122 can play the decoded version of the speech 138 for the user 120. However, because the user 120 is in the noisy environment 102 (e.g., the concert), the user 120 may not be able to hear what the user 130 said (e.g., hear the speech 138 output by the mobile device 122). For example, the decoded version of the speech 138 may have a relatively high signal-to-noise ratio because the speech 138 comes from a relatively noise-free environment 104. However, when the decoded version of the speech 138 is played back to the user 120 via a speaker as an audible signal, noise associated with the environment 102 may cause the signal-to-noise ratio of the output speech 138 that is experienced by the user 120 to be significantly lower than the signal-to-noise ratio of the decoded version of the speech 138 before playout. For example, the speech 138 that the user 120 hears may sound significantly different (e.g., less intelligible) than the speech 138 the user would hear if the user 120 was in a quieter environment.

As a result, the user 120 can become frustrated. In the example of FIG. 1, speech 128 from the user 120 into the mobile device 122 indicates that the user 120 is not able to understand the speech 138 from the user 130. For example, in FIG. 1, the user 120 yells "What did you say!?!?" into the mobile device 122 in response to not being able to hear (or understand) the speech 138 from the user 130.

To circumvent frustration for the user 120, the mobile device 122 is configured to convert the speech 138 of the user 130 to text 160 if a speech quality metric, such as the signal-to-noise ratio of the speech 138 experienced by the user 120, fails to satisfy a speech quality metric threshold. In other scenarios, the speech quality metric may include a speech intelligibility level, such as a percentage of words or phrases in the speech 138 that are intelligible. For example, the mobile device 122 can determine the speech quality metric for an incoming speech signal associated with the voice call 106. As referenced to above, the incoming speech signal may include a playout signal (e.g., the decoded version of the speech 138) output by a speaker of the mobile device 122. However, in other implementations, the incoming speech signal may include pulse code modulation samples generated at the mobile device 122 based on the encoded version of the speech 138, excitation signals generated at the mobile device 122 based on the encoded version of the speech 138, etc.

The mobile device 122 is configured to convert the incoming speech (e.g., the speech 138) associated with the incoming speech signal to text (e.g., the text 160) in response to a determination that the speech quality metric fails to satisfy a speech quality metric threshold. For example, the mobile device 122 can measure the amount of background noise in the environment 102 and measure signal statistics of the incoming speech signal to determine the speech quality metric. Based on the speech quality metric failing to satisfy the speech quality metric threshold, the mobile device 122 can convert the audio version of the speech 138 played out to the user 120 into a text format (e.g., into the text 160). Upon conversion, the mobile device 122 can display the text 160 at a display screen in addition to, or in place of, playing out the speech 138 as an audible signal.

According to one implementation, the mobile device 122 is configured to determine a distance 126 between the mobile device 122 and the user 120 of the mobile device 122 during the voice call 106. As a non-limiting example, the mobile device 122 can use a proximity sensor to determine the distance 126 (e.g., the proximity) between the user 120 and the mobile device 122. As another non-limiting example, a camera of the mobile device 122 can capture an image of the user 120 and the mobile device 122 can use an image recognition algorithm to compute the distance 126 between the user 120 and the mobile device 122 based on the image. The mobile device 122 converts the incoming speech 138 to the text 160 in response to a determination that the distance 126 satisfies a distance threshold. For example, if the distance 126 satisfies (e.g., is greater than) the distance threshold, the mobile device 122 can determine that there is a relatively high likelihood that the user 120 is looking at a display screen of the mobile device 122 (as opposed to having the mobile device 122 pressed up against an ear of the user 120). As a result, the mobile device 122 presents the text 160 in scenarios when there is a high likelihood that the user 120 is looking at the display screen of the mobile device 122.

The techniques described with respect to FIG. 1 enable the user 120 to understand the speech 138 of the user 130 during the voice call 106 when the user 120 is in a relatively noisy environment 102. For example, in scenarios where the user 130 is in a relatively noise-free environment 104, the speech 138 from the user 130 may not be readily discernable to the user 120 because the user 120 is in a noisy environment 102. To circumvent this problem, the mobile device 122 determines the amount of noise in the environment 102 of the user 120 to determine one or more speech quality metrics (e.g., a signal-to-noise ratio associated with the incoming speech 138, a speech intelligibility level associated with the incoming speech 138, etc.) associated with the incoming speech 138 as perceived by the user 120 based on the environment 102. If the one or more speech quality metrics fail to satisfy respective thresholds, the mobile device 122 converts the incoming speech 138 of the user 130 to text 160 to enable the user 120 to perceive what is said by the user 130. Additionally, the user 120 can compare the text 160 to what the user 120 audibly perceives is being said to determine whether to move to a quieter environment.

It should be noted that the techniques described with respect to FIG. 1 can also be integrated into a voice user interface or a voice assistant. For example, in response to a determination that one or more speech quality metrics of output speech (as perceived by the user 120) generated by a voice user interface fails to satisfy a threshold, the voice user interface can convert the output speech to text and display the text at a display screen to enable the user 120 to perceive what is said. The voice user interface can be integrated into the mobile device 122 or can be integrated into a separate device, such as a television, a computer, a stand-alone music player, etc. According to one implementation, the display screen that displays the text can be a separate device, such as a television, a computer, etc.

Figure 2:
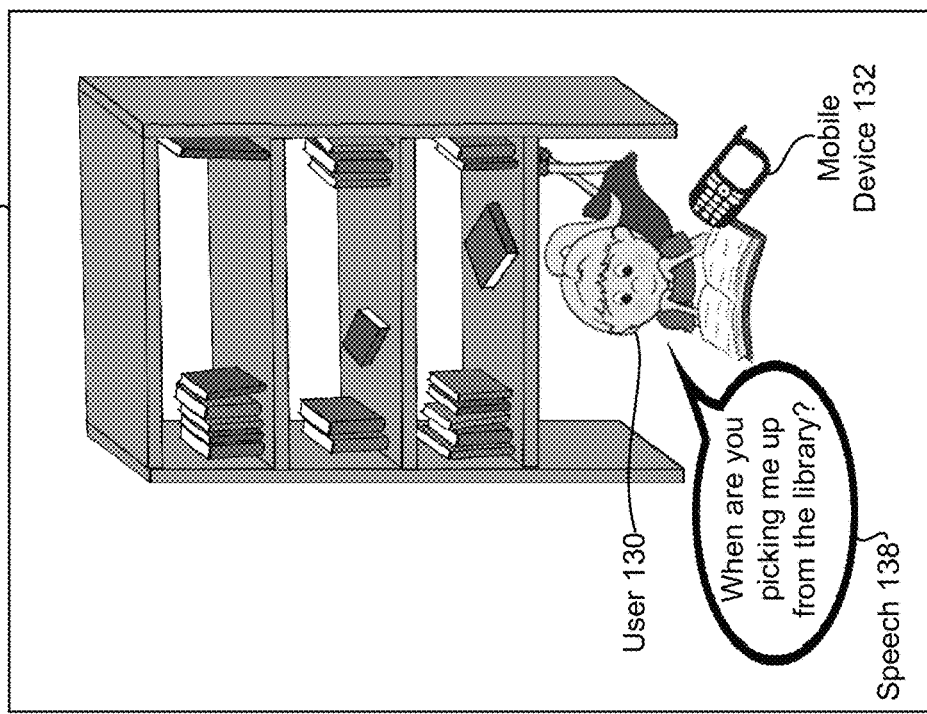
FIG. 2 is a diagram of an example of a system that includes another implementation of a mobile device operable to enable speech-to-text conversion based on a speech quality metric.
Figure 2:
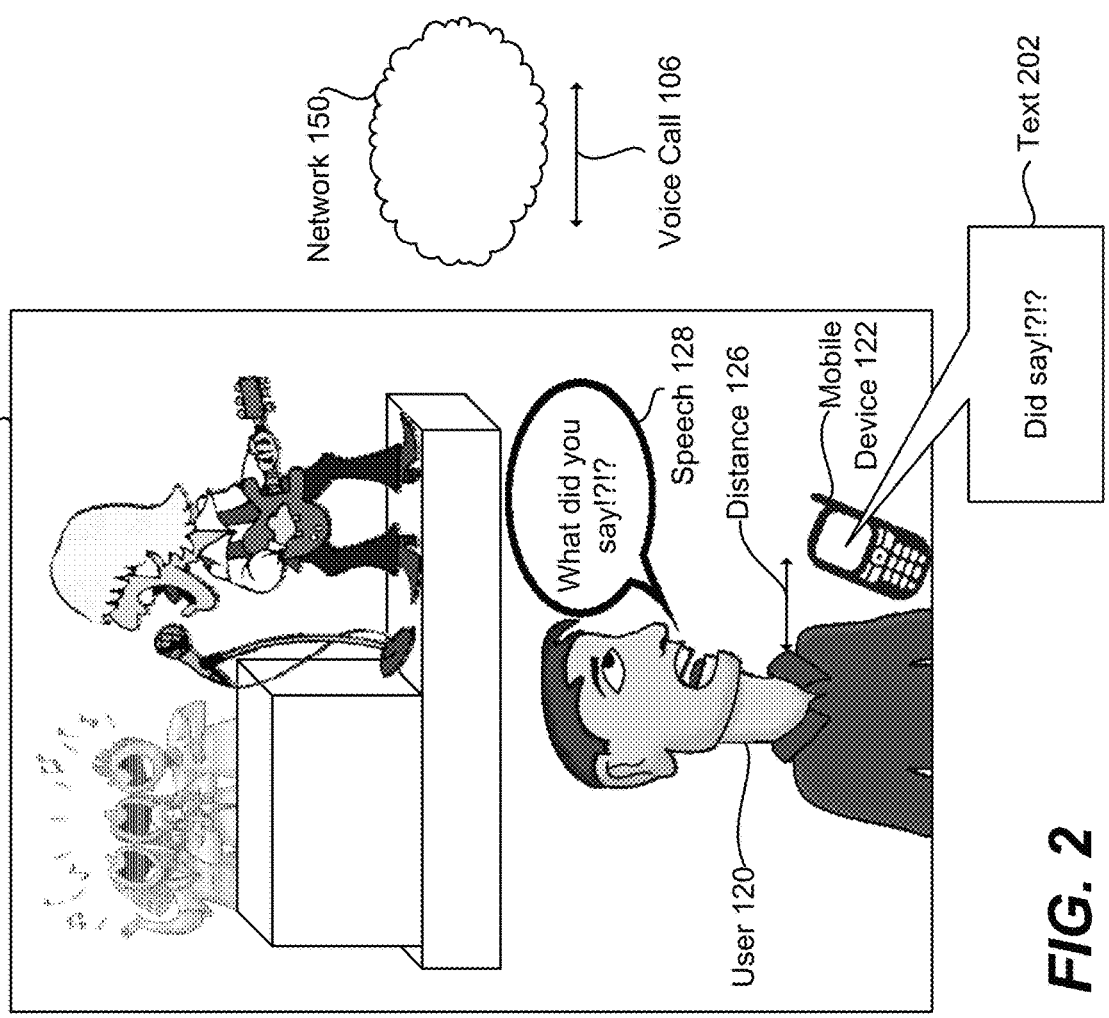

Referring to FIG. 2, another implementation of the system 100 is shown. In the implementation of FIG. 2, the outgoing speech 128 of the user 120 is converted to text 202 and displayed at the display screen of the mobile device 122 during the voice call 106. As a result, the user 120 is able to see what is heard by the user 130 during the voice call 106.

For example, the mobile device 122 is configured to determine a second speech quality metric for an outgoing speech signal associated with the outgoing speech 128. To illustrate, the microphone of the mobile device 122 captures the outgoing speech 128 of the user 120 and captures background noise associated with the environment 102. The mobile device 122 is configured to convert the outgoing speech 128 to text 202 in response to a determination that the second speech quality metric fails to satisfy a second speech quality metric threshold. For example, because of the background noise in the environment 102, the second speech quality metric (e.g., the signal-to-noise ratio, the speech intelligibility level, etc.) of the outgoing speech 128 may be relatively low. As a result, the text 202 may not accurately reflect the outgoing speech 128. For example, in the illustrative example of FIG. 2, the text 202 reads "Did say!?!?" while the outgoing speech 128 includes the phrase "What did you say!?!?". The difference between the text 202 and the outgoing speech 128 may be based to the relatively noisy environment 102.

The techniques described with respect to FIG. 2 enable the user 120 to perceive what the user 130 hears during the voice call 106. For example, the user 120 can compare the text 202 (e.g., an indication of what the user 130 hears) to what the user 120 actually said to determine whether a difference exists. If the user 120 determines that a difference exists, the user 120 can move to a quieter environment for improved communication.

It should be noted that the techniques described with respect to FIG. 2 can also be integrated into a voice user interface or a voice assistant. For example, a voice user interface can convert the outgoing speech 128 to text 202 in response to a determination that the second speech quality metric fails to satisfy the second speech quality metric threshold. The voice user interface can be integrated into the mobile device 122 or can be integrated into a separate device, such as a television, a computer, a stand-alone music player, etc. According to one implementation, the display screen that displays the text 202 can be a separate device, such as a television, a computer, etc.

Figure 3:
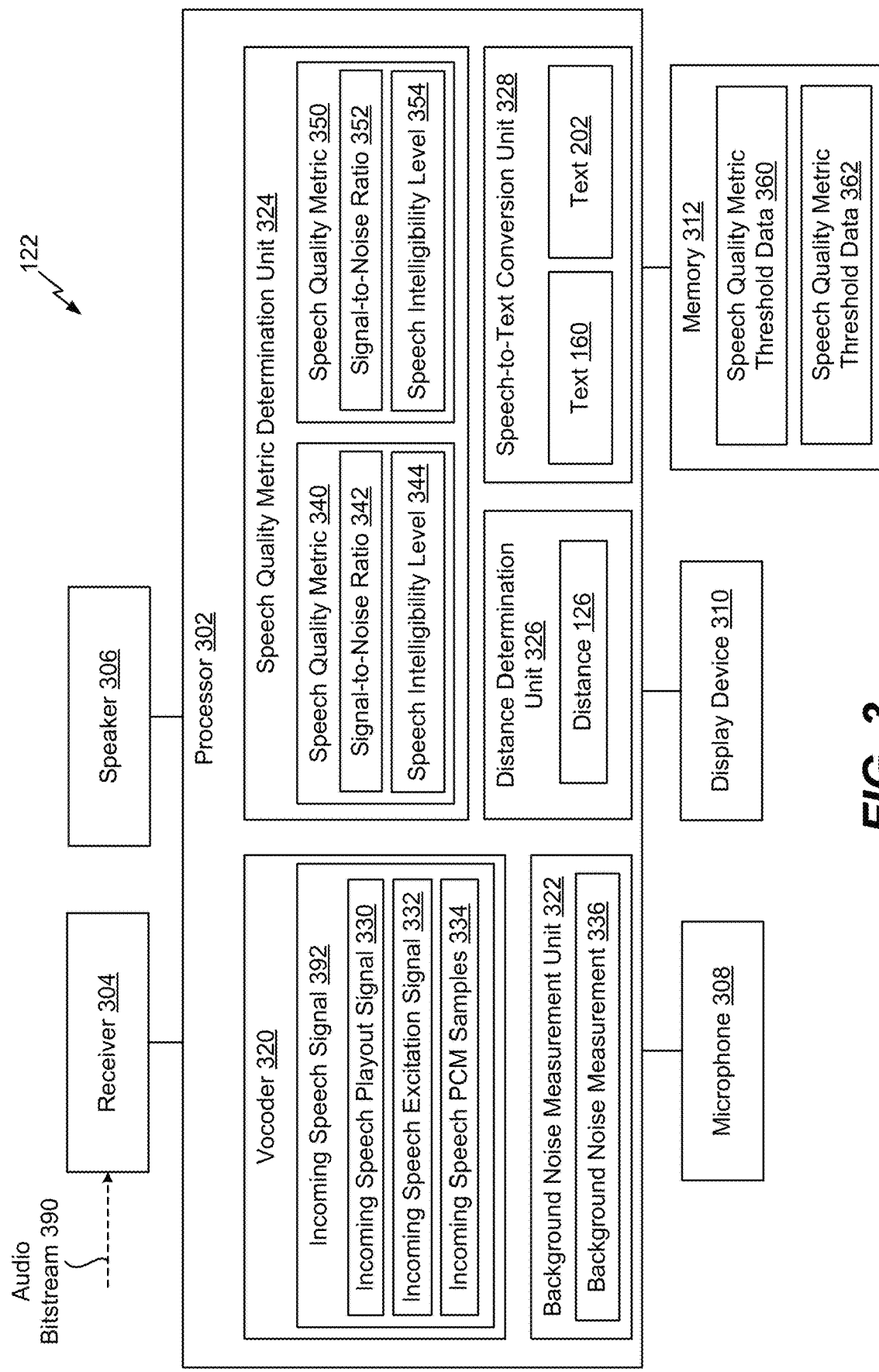
FIG. 3 is a block diagram of a particular implementation of a mobile device that is operable to enable speech-to-text conversion based on a speech quality metric.

Referring to FIG. 3, a block diagram of the mobile device 122 is shown. The mobile device 122 includes a processor 302, a receiver 304 coupled to the processor 302, a speaker 306 coupled to the processor 302, a microphone 308 coupled to the processor 302, a display device 310 coupled to the processor 302, and a memory 312 coupled to the processor 302. According to one implementation, the memory 312 is a non-transitory computer-readable medium that includes instructions (not shown) executable by the processor 302. The processor 302 includes a vocoder 320 (e.g., a speech encoder/decoder), a background noise measurement unit 322, a speech quality metric determination unit 324, a distance determination unit 326, and a speech-to-text conversion unit 328.

The receiver 304 is configured to receive an audio bitstream 390 associated with the voice call 106. For example, the incoming speech 138 can be encoded into the audio bitstream 390 and transmitted to the receiver 304 over the network 150. Thus, the receiver 304 can receive the audio bitstream 390 from the mobile device 132 during the voice call 106.

The vocoder 320 is configured to decode the audio bitstream 390 to generate an incoming speech signal 392. The incoming speech 138 is represented by the incoming speech signal 392. According to one implementation, the incoming speech signal 392 includes an incoming speech playout signal 330. For example, the vocoder 320 can decode the audio bitstream 390 to generate the incoming speech playout signal 330 that is played (e.g., output) to the user 120 during the voice call 106 by the speaker 306.

According to another implementation, the incoming speech signal 392 includes an incoming speech excitation signal 332. For example, the vocoder 320 can decode the audio bitstream 390 to generate the incoming speech excitation signal 332. According to another implementation, the incoming speech signal 392 includes incoming speech pulse code modulation (PCM) samples 334. For example, the vocoder 320 can generate incoming speech PCM samples 334 that are indicative of the incoming speech 138.

The background noise measurement unit 322 is configured to determine a background noise measurement 336. For example, the microphone 308 can capture background noise of the environment 102, and the background noise measurement unit 322 can measure the background noise (e.g., the decibel reading of the background noise) to determine the background noise measurement 336.

The speech quality metric determination unit 324 is configured to determine a speech quality metric 340 for the incoming speech signal 392 associated with the voice call 106. The speech quality metric 340 is based on the environment 102 of the mobile device 122. For example, the speech quality metric 340 is based on the background noise measurement 336 indicative of noise in the environment 102. To illustrate, according to one implementation, the speech quality metric 340 includes a signal-to-noise ratio 342 of the incoming speech signal 392 with respect to the background noise measurement 336. According to another example, the speech quality metric 340 includes a speech intelligibility level 344 of the incoming speech signal 392 with respect to the background noise measurement 336. The speech intelligibility level 344 indicates a percentage of intelligible words or phrases from the incoming speech signal 392.

The processor 302 is configured to compare the speech quality metric 340 to a speech quality metric threshold. For example, the memory 312 stores speech quality metric threshold data 360 that indicates a speech quality metric threshold. If the speech quality metric 340 fails to satisfy the speech quality metric threshold, the speech-to-text conversion unit 328 is configured to convert the incoming speech 138 associated with the incoming speech signal 392 to the text 160. For example, based on the speech quality metric 340 failing to satisfy (e.g., being less than) the speech quality metric threshold, the speech-to-text conversion unit 328 converts the audio version of the speech 138 played out to the user 120 into a text format. Upon conversion, the processor 302 can display the text 160 at the display device 310.

According to one implementation, the distance determination unit 326 is configured to determine the distance 126 between the mobile device 122 and the user 120 of the mobile device 122 during the voice call 106. As a non-limiting example, the distance determination unit 326 can include a specific absorption rate (SAR) proximity sensor to determine the distance 126 (e.g., the proximity) between the user 120 and the mobile device 122. If the distance 126 satisfies (e.g., is greater than) the distance threshold, the processor 302 can operate as if the user 120 is looking at the display device 310 as opposed to having the display device 310 pressed against the user's ear. According to this implementation, the speech-to-text conversion unit 328 converts the incoming speech 138 to the text 160 in response to a determination that the distance 126 satisfies the distance threshold. As a result, the mobile device 122 presents the text 160 in scenarios when there is a relatively high likelihood that the user 120 is looking at the display device 310.

The speech quality metric determination unit 324 is also configured to determine a speech quality metric 350 for an outgoing speech signal associated with the outgoing speech 128. To illustrate, the microphone 308 captures the outgoing speech 128 of the user 120 and captures background noise associated with the environment 102. The speech quality metric 350 is based on the environment 102 of the mobile device 122. For example, the speech quality metric 350 is based on the background noise measurement 336 indicative of noise in the environment 102. To illustrate, according to one implementation, the speech quality metric 350 includes a signal-to-noise ratio 352 of the outgoing speech 128 with respect to the background noise measurement 336. According to another example, the speech quality metric 350 includes a speech intelligibility level 354 of the outgoing speech 128 with respect to the background noise measurement 336.

The speech-to-text conversion unit 328 is configured to convert the outgoing speech 128 to text 202 in response to a determination that the speech quality metric 350 fails to satisfy a second speech quality metric threshold. For example, the memory 312 stores speech quality metric threshold data 362 that indicates the second speech quality metric threshold. If the speech quality metric 350 fails to satisfy the second speech quality metric threshold, the speech-to-text conversion unit 328 is configured to convert the outgoing speech 128 to the text 202. For example, based on the speech quality metric 350 failing to satisfy the speech quality metric threshold, the speech-to-text conversion unit 328 converts the audio version of the speech 128 into a text format. Upon conversion, the processor 302 can display the text 202 at the display device 310.

The techniques described with respect to FIG. 3 enable the user 120 to understand the incoming speech 138 of the user 130 during the voice call 106 when the user 120 is in a relatively noisy environment 102. For example, in scenarios where the user 130 is in a relatively noise-free environment 104, the speech 138 from the user 130 may not be readily discernable to the user 120 because the user 120 is in a noisy environment 102. To circumvent this problem, the background noise measurement unit 322 determines the background noise measurement 336 in the environment 102 to determine one or more speech quality metrics 340 (e.g., the signal-to-noise ratio 342 associated with the incoming speech 138, the speech intelligibility level 344 associated with the incoming speech 138, etc.) associated with the incoming speech 138 as perceived by the user 120 based on the environment 102. If the one or more speech quality metrics 340 fail to satisfy respective thresholds, the speech-to-text conversion unit 328 converts the incoming speech 138 of the user 130 to text 160 to enable the user 120 to perceive what is said by the user 130. The techniques described with respect to FIG. 3 also enable the user 120 to perceive what the user 130 hears during the voice call 106. For example, the user 120 can compare the text 202 (e.g., an indication of what the user 130 hears) to what the user 120 actually said to determine whether a difference exists. If the user 120 determines that a difference exists, the user 120 can move to a quieter environment for improved communication.

Figure 4:
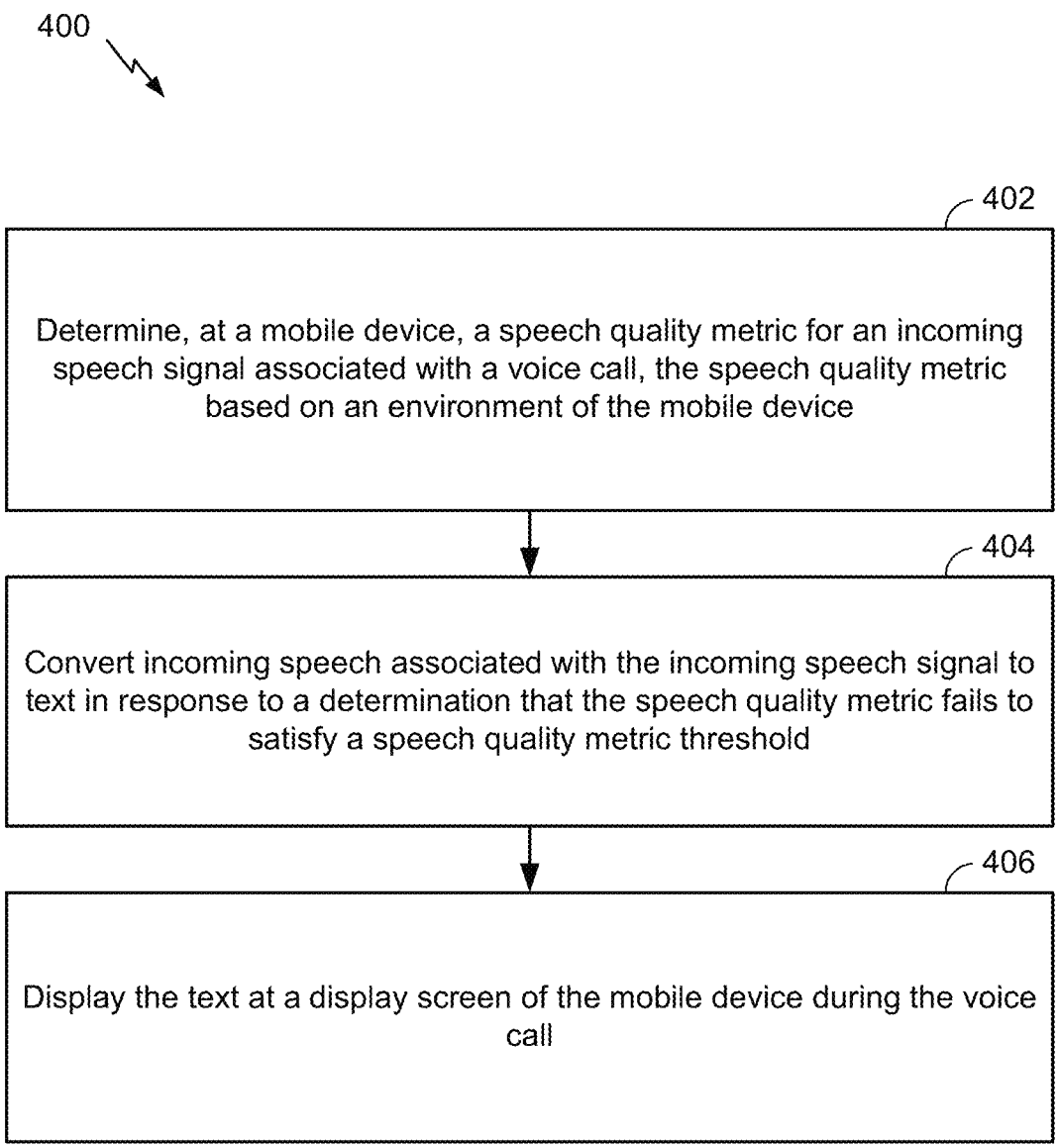
FIG. 4 illustrates a flowchart of a particular implementation of a method for enabling speech-to-text conversion based on a speech quality metric.

Referring to FIG. 4, a method 400 for enabling speech-to-text conversion based on a speech quality metric is shown. The method 400 may be performed by the mobile device 122 of FIGS. 1-3.

The method 400 includes determining, at a mobile device, a speech quality metric for an incoming speech signal associated with a voice call, at 402. The speech quality metric is based on an environment of the mobile device. For example, the speech quality metric determination unit 324 determines the speech quality metric 340 for the incoming speech signal 392 associated with the voice call 106. The speech quality metric 340 is based on the environment 102 of the mobile device 122. For example, the speech quality metric 340 is based on the background noise measurement 336 indicative of noise in the environment. The speech quality metric 340 includes the signal-to-noise ratio 342 of the incoming speech signal 392, the speech intelligibility level 344 of the incoming speech signal 392, or both. According to one implementation of the method 400, the incoming speech signal includes a playout signal output by a speaker of the mobile device. For example, referring to FIG. 3, the incoming speech signal 320 can include the incoming speech playout signal 330.

The method 400 also includes converting incoming speech associated with the incoming speech signal to text in response to a determination that the speech quality metric fails to satisfy a speech quality metric threshold, at 404. For example, if the speech quality metric 340 fails to satisfy the speech quality metric threshold, the speech-to-text conversion unit 328 converts the incoming speech 138 associated with the incoming speech signal 392 to the text 160. The method 400 also includes displaying the text at a display screen of the mobile device during the voice call, at 406. For example, the processor 302 displays the text 160 at the display device 310 (e.g., a display screen) of the mobile device 122.

According to one implementation, the method 400 includes determining a distance between the mobile device and a user of the mobile device during the voice call. The incoming speech may be converted to the text in response to a determination that the distance satisfies a distance threshold. In an example, the distance determination unit 326 is configured to determine the distance 126 between the mobile device 122 and the user 120 of the mobile device 122 during the voice call 106. For example, the distance determination unit 326 determines the distance 126 (e.g., the proximity) between the user 120 and the mobile device 122. If the distance 126 satisfies (e.g., is greater than) the distance threshold, the processor 302 can determine that the user 120 is looking at the display device 310 as opposed to having the display device 310 pressed against the user's ear. According to this implementation, the speech-to-text conversion unit 328 converts the incoming speech 138 to the text 160 in response to a determination that the distance 126 satisfies the distance threshold. As a result, the mobile device 122 presents the text 160 in scenarios when there is a relatively high likelihood that the user 120 is looking at the display device 310.

According to one implementation, the method 400 includes receiving an audio bitstream from a second mobile device and decoding the audio bitstream at a vocoder of the mobile device to generate one or more pulse code modulation samples. In this implementation, the audio bitstream is associated with the voice call, and the incoming speech signal corresponds to the one or more pulse code modulation samples. For example, the receiver 304 receives the audio bitstream 390 and the vocoder 320 decodes the audio bitstream 390 to generate the incoming speech PCM samples 334 that are reflective of the incoming speech 138.

According to one implementation, the method 400 includes receiving an audio bitstream from a second mobile device and decoding the audio bitstream at a vocoder of the mobile device to generate an excitation signal. In this implementation, the audio bitstream is associated with the voice call, and the incoming speech signal corresponds to the excitation signal. For example, the receiver 304 receives the audio bitstream 390 and the vocoder 320 decodes the audio bitstream 390 to generate the incoming speech excitation signal 332.

According to one implementation, the method 400 includes determining, at the mobile device, a second speech quality metric for an outgoing speech signal during the voice call. For example, the speech quality metric determination unit 324 determines the speech quality metric 350 for the outgoing speech signal associated with the outgoing speech 128. To illustrate, the microphone 308 captures the outgoing speech 128 of the user 120 and captures background noise associated with the environment 102. The speech quality metric 340 is based on the environment 102 of the mobile device 122. For example, the speech quality metric 350 is based on the background noise measurement 336 indicative of noise in the environment 102.

According to one implementation, the second speech quality metric includes a second signal-to-noise ratio of the outgoing speech signal, a second speech intelligibility level of the outgoing speech signal, or both. For example, the speech quality metric 350 includes the signal-to-noise ratio 352 of the outgoing speech signal, the speech intelligibility level 354 of the outgoing speech signal, or both.

The method 400 can also include converting outgoing speech associated with the outgoing speech signal to second text at least in response to a determination that the second speech quality metric fails to satisfy a second speech quality metric threshold. For example, the speech-to-text conversion unit 328 converts the outgoing speech 128 to text 202 in response to a determination that the speech quality metric 350 fails to satisfy a second speech quality metric threshold. The method 400 can also include displaying the second text at the display screen of the mobile device during the voice call. For example, the processor 302 displays the text 202 at the display device 310 of the mobile device 122 during the voice call 106.

The method 400 enables the user 120 to understand the incoming speech 138 of the user 130 during the voice call 106 when the user 120 is in a relatively noisy environment 102. For example, in scenarios where the user 130 is in a relatively noise-free environment 104, the speech 138 from the user 130 may not be readily discernable to the user 120 because the user 120 is in a noisy environment 102. To circumvent this problem, the background noise measurement unit 322 determines the background noise measurement 336 in the environment 102 to determine one or more speech quality metrics 340 (e.g., the signal-to-noise ratio 342 associated with the incoming speech 138, the speech intelligibility level 344 associated with the incoming speech 138, etc.) associated with the incoming speech 138 as perceived by the user 120 based on the environment 102. If the one or more speech quality metrics 340 fail to satisfy respective thresholds, the speech-to-text conversion unit 328 converts the incoming speech 138 of the user 130 to text 160 to enable the user 120 to perceive what is said by the user 130. The method 400 also enables the user 120 to perceive what the user 130 hears during the voice call 106. For example, the user 120 can compare the text 202 (e.g., an indication of what the user 130 hears) to what the user 120 actually said to determine whether a difference exists. If the user 120 determines that a difference exists, the user 120 can move to a quieter environment for improved communication.

Figure 5:
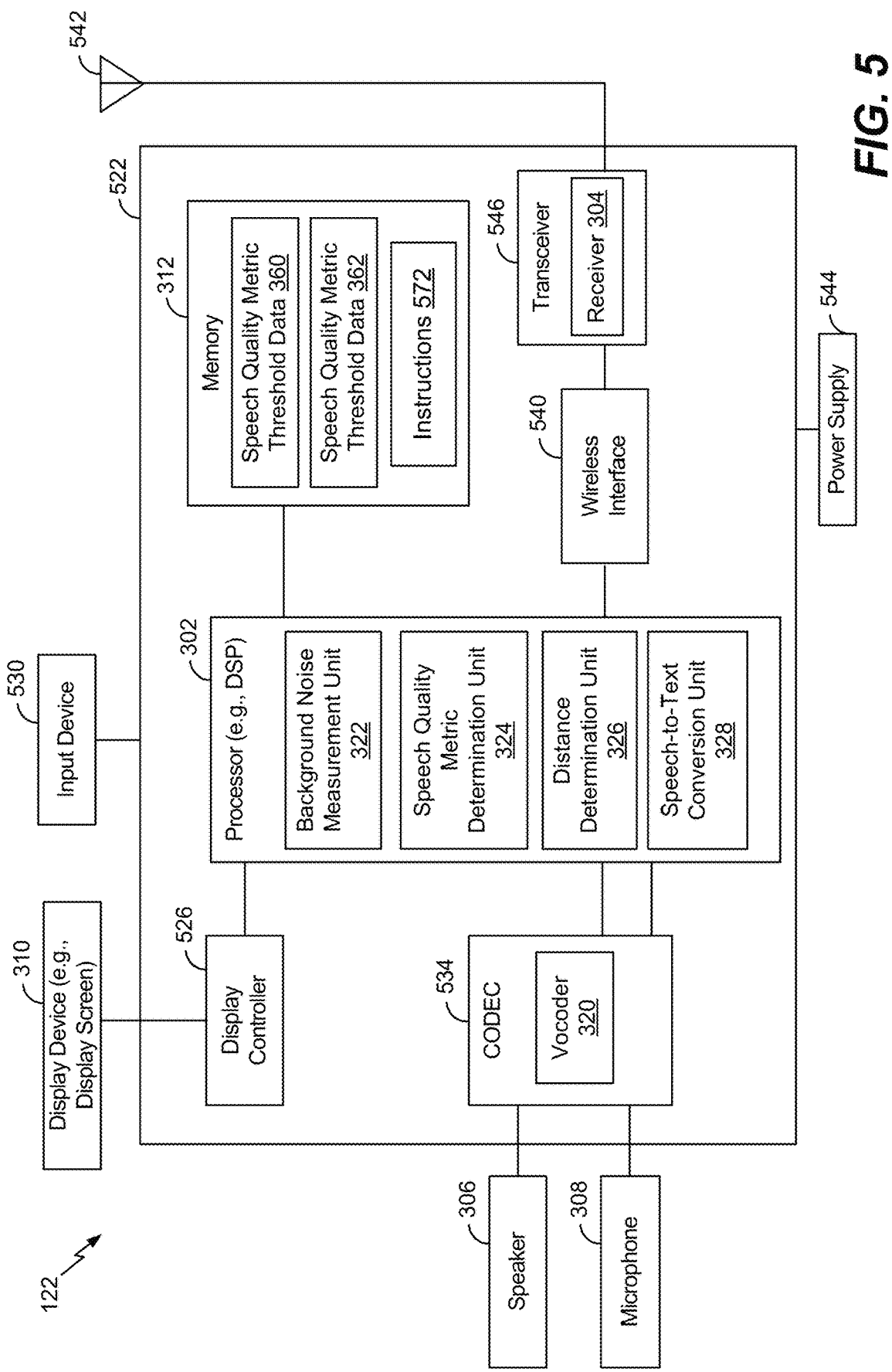
FIG. 5 is a block diagram of a particular illustrative example of a mobile device that is operable to perform the techniques described with reference to FIGS. 1-4.

Referring to FIG. 5, a block diagram of a particular illustrative implementation of the mobile device 122 (e.g., a wireless communication device) is shown. In various implementations, the mobile device 122 may have more components or fewer components than illustrated in FIG. 5. In a particular implementation, the mobile device 122 includes the processor 302, such as a central processing unit (CPU) or a digital signal processor (DSP), coupled to the memory 312. The memory 312 includes instructions 572 (e.g., executable instructions) such as computer-readable instructions or processor-readable instructions. The instructions 572 may include one or more instructions that are executable by a computer, such as the processor 302. The processor 302 includes the background noise measurement unit 322, the speech quality metric determination unit 324, the distance determination unit 326, and the speech-to-text conversion unit 328.

FIG. 5 also illustrates a display controller 526 that is coupled to the processor 302 and to the display device 310 (e.g., a display screen). A coder/decoder (CODEC) 534 may also be coupled to the processor 102. In FIG. 5, the CODEC 534 includes the vocoder 320. The speaker 306 and the microphone 308 are coupled to the CODEC 534. FIG. 5 further illustrates that a wireless interface 540, such as a wireless controller, and a transceiver 546 may be coupled to the processor 302 and to an antenna 542, such that the audio bitstream 390 received via the antenna 542, the transceiver 546, and the wireless interface 540 may be provided to the processor 302. The transceiver 546 includes the receiver 304 and a transmitter (not shown).

In some implementations, the processor 302, the display controller 526, the memory 312, the CODEC 534, the wireless interface 540, and the transceiver 546 are included in a system-in-package or system-on-chip device 522. In some implementations, an input device 530 and a power supply 544 are coupled to the system-on-chip device 522. Moreover, in a particular implementation, as illustrated in FIG. 5, the display device 310, the input device 530, the speaker 306, the microphone 308, the antenna 542, and the power supply 544 are external to the system-on-chip device 522. In a particular implementation, each of the display device 310, the input device 530, the speaker 306, the microphone 308, the antenna 542, and the power supply 544 may be coupled to a component of the system-on-chip device 522, such as an interface or a controller.

The mobile device 122 may include a headset, a smart watch, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as illustrative, non-limiting examples.

In an illustrative implementation, the memory 312 may include or correspond to a non-transitory computer readable medium storing the instructions 572. The instructions 572 may include one or more instructions that are executable by a computer, such as the processor 302. The instructions 572 may cause the processor 302 to perform the method 400 of FIG. 4.

One or more components of the mobile device 122 may be implemented via dedicated hardware (e.g., circuitry), by a processor executing instructions to perform one or more tasks, or a combination thereof. As an example, the memory 312 or one or more components of the processor 302, and/or the CODEC 534 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 572) that, when executed by a computer (e.g., a processor in the CODEC 534 or the processor 302), may cause the computer to perform one or more operations described with reference to FIGS. 1-4.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the described techniques, a mobile device includes means for determining a speech quality metric for an incoming speech signal associated with a voice call. The speech quality metric is based on an environment of the mobile device. For example, the means for determining the speech quality metric may include the processor 302, the speech quality metric determination unit 324, the vocoder 320, the instructions 572 executable by a computing device, one or more other devices, circuits, modules, sensors, or any combination thereof.

The mobile device also includes means for converting incoming speech associated with the incoming speech signal to text in response to a determination that the speech quality metric fails to satisfy a speech quality metric threshold. For example, the means for converting the incoming speech may include the processor 302, the speech-to-text conversion unit 328, the vocoder 320, the instructions 572 executable by a computing device, one or more other devices, circuits, modules, sensors, or any combination thereof.

The mobile device further includes means for displaying the text during the voice call. For example, the means for displaying may include the processor 302, the display device 310, the display controller 526, the instructions 572 executable by a computing device, one or more other devices, circuits, modules, sensors, or any combination thereof.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A mobile device comprising:
   a microphone configured to capture an outgoing speech signal during a voice call;
   a processor configured to:
      determine a speech quality metric for an incoming speech signal associated with the voice call, the speech quality metric based on a comparison of the incoming speech signal to a noise level associated with an environment of the mobile device;
      convert incoming speech associated with the incoming speech signal to text in response to a determination that the speech quality metric fails to satisfy a speech quality metric threshold;
      determine a second speech quality metric based on the outgoing speech signal; and
      convert outgoing speech associated with the outgoing speech signal to second text in response to a determination that the second speech quality metric fails to satisfy a second speech quality metric threshold; and
   a display screen configured to display the text and the second text during the voice call.

2. The mobile device of claim 1, wherein the processor is further configured to use a specific absorption rate (SAR) proximity sensor to determine a distance between the mobile device and a user of the mobile device during the voice call, and wherein the incoming speech is converted to the text in response to a determination that the distance satisfies a distance threshold.

3. The mobile device of claim 1, wherein the speech quality metric includes a speech intelligibility level of the incoming speech signal, wherein the speech intelligibility level corresponds to a percentage of words or phrases that are determined to be unintelligible in view of the environment.

4. The mobile device of claim 1, further comprising:
   a receiver configured to receive an audio bitstream from a second mobile device, the audio bitstream associated with the voice call; and
   a vocoder configured to decode the audio bitstream to generate one or more pulse code modulation samples, wherein the incoming speech signal corresponds to the one or more pulse code modulation samples.

5. The mobile device of claim 1, further comprising:
   a receiver configured to receive an audio bitstream from a second mobile device, the audio bitstream associated with the voice call; and
   a vocoder configured to decode the audio bitstream to generate an excitation signal, wherein the incoming speech signal corresponds to the excitation signal.

6. The mobile device of claim 1, wherein the speech quality metric includes a signal-to-noise ratio of the incoming speech signal as determined in view of the environment.

7. The mobile device of claim 1, wherein the second speech quality metric includes a signal-to-noise ratio of the outgoing speech signal as determined in view of the environment.

8. The mobile device of claim 1, wherein the second speech quality metric includes a second signal-to-noise ratio of the outgoing speech signal.

9. A method of communication, the method comprising:
   determining, at a mobile device, a speech quality metric for an incoming speech signal associated with a voice call, the speech quality metric based on a comparison of the incoming speech signal to a noise level associated with an environment of the mobile device;
   converting incoming speech associated with the incoming speech signal to text in response to a determination that the speech quality metric fails to satisfy a speech quality metric threshold;
   determining a second speech quality metric based on an outgoing speech signal during the voice call;
   convert outgoing speech associated with the outgoing speech signal to second text in response to a determination that the second speech quality metric fails to satisfy a second speech quality metric threshold; and
   displaying the text and the second text at a display screen of the mobile device during the voice call.

10. The method of claim 9, further comprising determining a distance between the mobile device and a user of the mobile device during the voice call, wherein the incoming speech is converted to the text in response to a determination that the distance satisfies a distance threshold.

11. The method of claim 9, wherein the incoming speech signal comprises a playout signal output by a speaker of the mobile device.

12. The method of claim 9, further comprising:
   receiving an audio bitstream from a second mobile device, the audio bitstream associated with the voice call; and
   decoding the audio bitstream at a vocoder of the mobile device to generate one or more pulse code modulation samples, wherein the incoming speech signal corresponds to the one or more pulse code modulation samples.

13. The method of claim 9, further comprising:
   receiving an audio bitstream from a second mobile device, the audio bitstream associated with the voice call; and
   decoding the audio bitstream at a vocoder of the mobile device to generate an excitation signal, wherein the incoming speech signal corresponds to the excitation signal.

14. The method of claim 9, wherein the speech quality metric includes a signal-to-noise ratio of the incoming speech signal, a speech intelligibility level of the incoming speech signal, or both.

15. The method of claim 9, wherein the second speech quality metric includes a speech intelligibility level of the incoming speech signal, wherein the speech intelligibility level corresponds to a percentage of words or phrases that are determined to be unintelligible in view of the environment.

16. The method of claim 9, wherein the second speech quality metric includes a second signal-to-noise ratio of the outgoing speech signal, a second speech intelligibility level of the outgoing speech signal, or both.

17. A non-transitory computer-readable medium comprising instructions that, when executed by a processor of a mobile device, cause the processor to perform operations comprising:

determining a speech quality metric for an incoming speech signal associated with a voice call, the speech quality metric based on a comparison the incoming speech signal to a noise level associated with an environment of the mobile device;

converting incoming speech associated with the incoming speech signal to text in response to a determination that the speech quality metric fails to satisfy a speech quality metric threshold;

determine a second speech quality metric based on an outgoing speech signal during the voice call;

convert outgoing speech associated with the outgoing speech signal to second text in response to a determination that the second speech quality metric fails to satisfy a second speech quality metric threshold; and displaying the text at a display screen of the mobile device during the voice call.

18. The non-transitory computer-readable medium of claim 17, wherein the operations further comprise determining a distance between the mobile device and a user of the mobile device during the voice call, wherein the incoming speech is converted to the text in response to a determination that the distance satisfies a distance threshold.

19. The non-transitory computer-readable medium of claim 17, wherein the incoming speech signal comprises a playout signal output by a speaker of the mobile device.

20. The non-transitory computer-readable medium of claim 18, wherein the distance is determined based on an image of the user captured by a camera.

\* \* \* \* \*